May 2, 1933.　　　　T. M. DURKAN　　　　1,906,845

METHOD OF AND APPARATUS FOR RELIEVING FACE MILL CUTTER BLADES

Filed April 27, 1929　　　2 Sheets-Sheet 1

INVENTOR
THOMAS M. DURKAN
BY B.E.Schlesinger
ATTORNEY

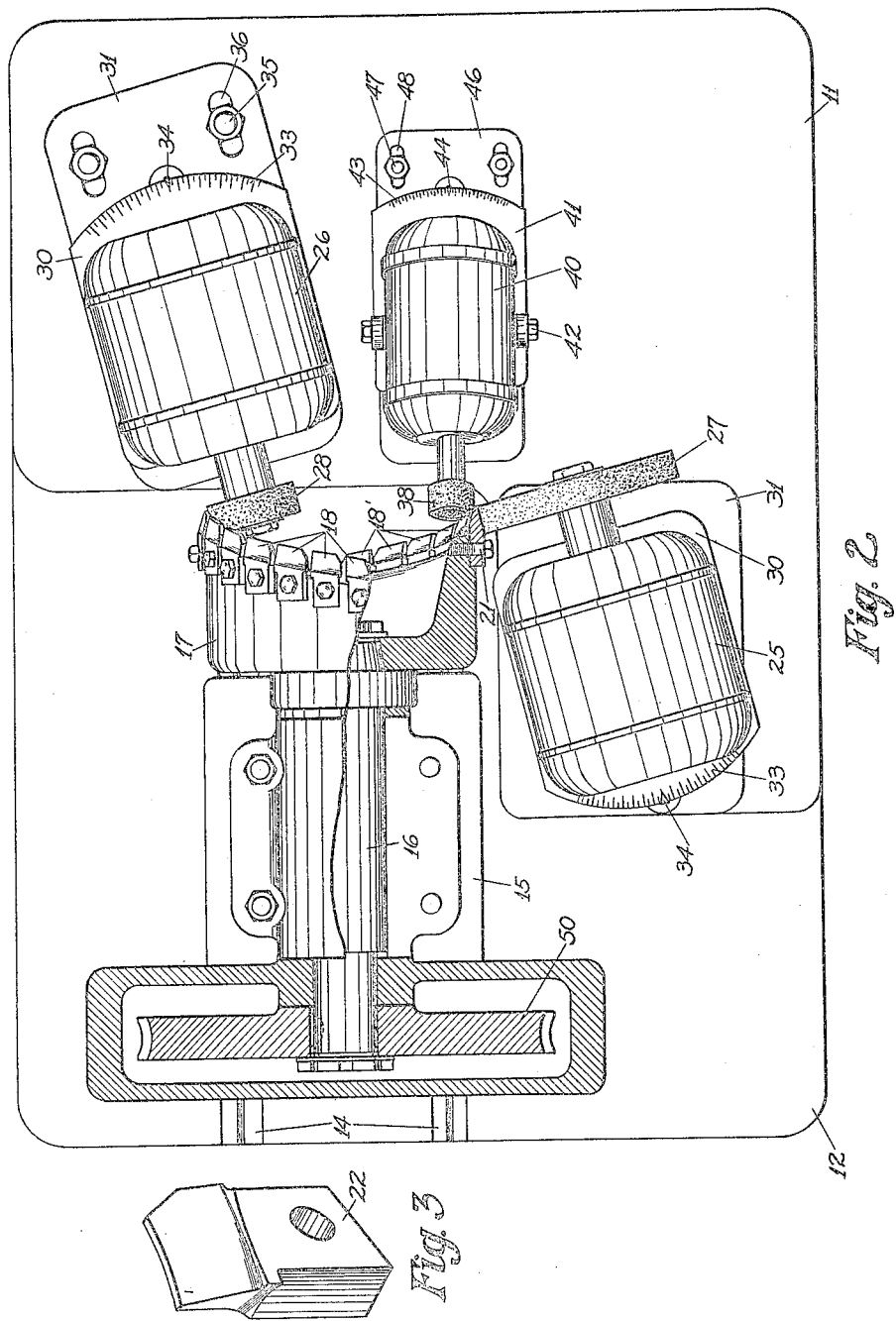

Patented May 2, 1933

1,906,845

UNITED STATES PATENT OFFICE

THOMAS M. DURKAN, OF ROCHESTER, NEW YORK, ASSIGNOR TO GLEASON WORKS, OF ROCHESTER, NEW YORK, A CORPORATION OF NEW YORK

METHOD OF AND APPARATUS FOR RELIEVING FACE MILL CUTTER BLADES

Application filed April 27, 1929. Serial No. 358,762.

The present invention relates to the relieving of cutter blades and particularly to the relief grinding of the blades of face mill cutters such as are employed in the cutting of spiral bevel and hypoid gears.

The present invention has for its purpose to provide apparatus and a method for grinding that relief on cutter blades which is required to afford the necessary clearance for the cutting edges of the blades when the blades are employed in the cutting of a gear blank. More particularly, the invention has for its objects to provide an efficient, simple, and accurate method of relief grinding the blades of face mill gear cutters and the provision of apparatus capable of rigid and simple construction which may be employed to relief grind the blades accurately and expeditiously.

Other objects of the invention will be apparent hereinafter from the specification and from the disclosure of the accompanying drawings and the recital of the appended claims.

In the drawings:

Figure 2 is a plan view, with parts broken away, of the machine shown in Figure 1;

Figure 3 is a perspective view, on an enlarged scale, of a cutter blade such as may be relief ground on the machine shown;

Figure 1:
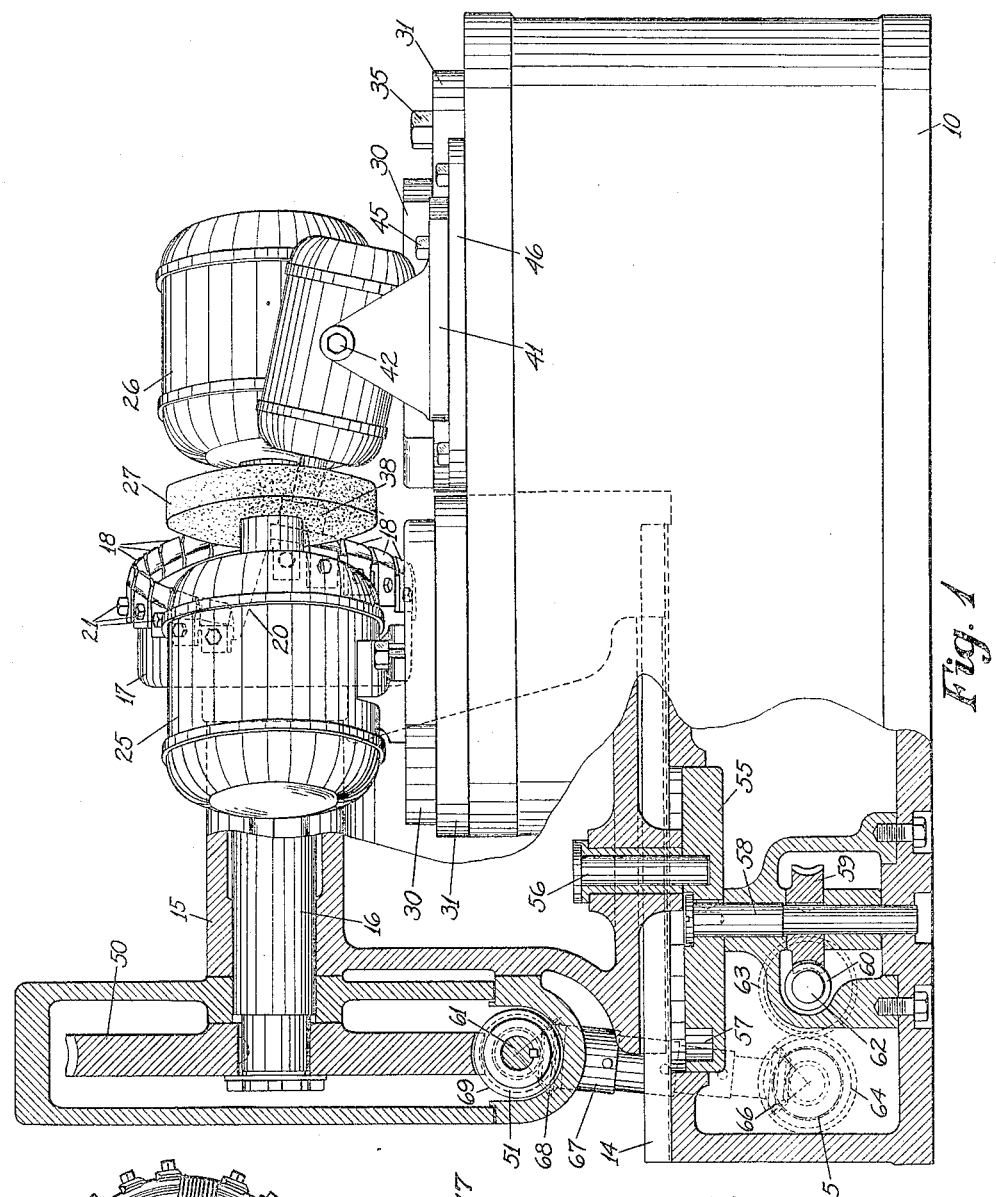
Figure 1 is a side elevation, with parts broken away, of a relieving grinder constructed according to one embodiment of this invention.
Figure 4:
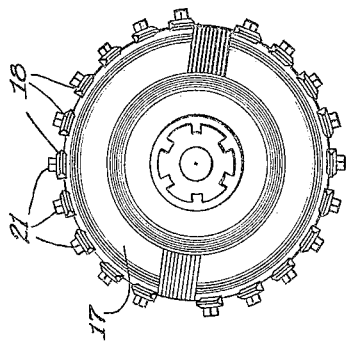
Figure 4 is an elevation of the cutter head, looking at the front face of the same.
Figure 5:
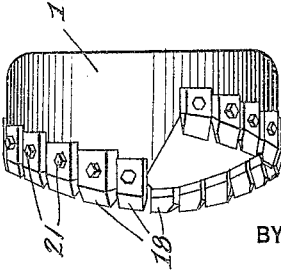
Figure 5 is a side elevation of the cutter head, looking at it from the other side from that shown in Figure 1.

In order that a cutting tool may cut efficiently, it must be relieved back of its cutting edge or edges to prevent drag of the sides of the tool along the surface being cut. In face mill gear cutters a plurality of cutting blades are arranged on a rotatable cutter head so that the blades extend generally in the direction of the axis of the head and the blades cut as the head rotates on its axis. Each of the cutting blades is relieved, then, on both side faces and on its tip surface from front to rear, thus providing the necessary cutting clearance between the sides and tip of the blade and the sides and bottom of the tooth space or tooth being cut as the cutter rotates in engagement with the gear blank.

In relieving face mill cutter blades according to this invention, a series of blades are arranged in a helix on a rotatable head and as the head rotates, a movement of approach or recess is produced between the head and the relieving tool or tools, this movement in conjunction with the rotation of the head effecting the relief of the blades. The direction of rotation of the head, on which the blades are mounted for the relieving operation, will correspond preferably to the direction of rotation of the blades when they are secured in a cutter head for the cutting of gears, so that in the relieving operation, the cutting edges of the blades will come into contact with the relieving tools initially and the blades will be relieved back of these cutting edges as is desired.

In relieving grinders, the usual cycle is to impart a relieving motion between the relieving tool and the cutter head for each blade as that blade rotates under the relieving tool. That is to say, the grinding member is fed toward and away from the head on which the blades are mounted as each blade rotates past the grinding member. In the present invention, however, the relieving motion takes place only once during the rotation of a whole group of blades past the relieving tool. There is a slow, continuous movement of approach or recess as the series of helically arranged blades rotate under the relieving tool and a quick reverse movement when the last blade of the series has cleared the relieving tool, the relieving tool being returned to initial position on this reverse movement ready to commence the relieving operation on the next series of blades.

In a machine constructed according to this invention, the cutting blades to be relieved may be arranged in a single helical convolution or in a plurality of partial convolutions containing, preferably, equal numbers of blades, corresponding blades of each series or groups being arranged preferably in equal positions along the axis of the helix. The arrangement of the blades in a plurality of partial convolutions is considered preferable as it keeps down the size and the cost of the machine. Where the blades are arranged in a plurality of partial helical convolutions the number of relieving cycles during each revolution of the head will equal the number of helical groups of blades arranged on the head.

Reference may be had to the drawings for a more complete understanding of this invention. 10 indicates the base or frame of a machine constructed according to one embodiment of this invention. At one end, the frame is so constructed as to form a generally L-shaped support on which the grinding wheels are mounted, as will hereinafter be described. The remainder of the base or frame is constructed so that its upper face lies in a plane, as clearly shown in Figure 1, below the plane of the upper face of the L-shaped grinding wheel support. The upper face of the L-shaped support is designated by the numeral 11 and the upper face of the remainder of the frame by the numeral 12. Guide ways 14 are formed on the upper face 12 which extend longitudinally of the frame. Mounted on these guide ways 14 for sliding movement thereon is an upright 15 in which is journaled the spindle 16 to which the cutter head 17 is secured. In the embodiment shown, there are two groups of cutting blades arranged on the head 17. The blades of one group are designated by the numeral 18 and of the other group by the numeral 18'. Each group forms a partial helical convolution extending somewhat less than 180° around the head. The end of the cutter head 17 is of such shape that the tips of the blades of a given group will all lie in a helix. In the arrangement shown, the foremost points of the two helices lie in the same plane and the rearmost points of the two helices lie in another parallel plane both planes being perpendicular to the axis 16 of the cutter head. The dotted line 20 seen in Figure 1 indicates that portion of the end of the cutter head 17 which forms the juncture between the outermost point of one helix and the innermost point of the other. At the other side of the cutter head, a similar line but oppositely inclined connects the innermost point of the first helix with the outermost point of the other. The blades of the respective groups are secured to the cutter head by screws 21.

One of the blades is shown on an enlarged scale at 22 in Figure 3. The sides of the blade are curved from front to rear and the side and top surfaces are relieved to provide the necessary cutting clearance.

To provide this clearance, the blades are relief ground on both side faces and on their tip surfaces. The three grinding wheels for effecting the relieving operation are mounted upon the L-shaped portion of the frame. Each of the grinding wheels is mounted directly upon the armature shaft of an electric motor which is employed for rotating the grinding wheel. The motors 25 and 26, which drive, respectively, the grinding wheels 27 and 28 employed, respectively, to grind the outside and inside faces of the blades, are mounted in similar manner upon the upper face of the L-shaped portion of the frame. Each motor base 30 is angularly adjustable upon a sub-base 31. The sub-bases 31 are in turn adjustable on the surface 11 in the direction, respectively, of the axes of the respective grinding wheels 27 and 28. The angular adjustment of the base 30 upon the sub-base 31 has the purpose, in the case of both the grinding wheels 27 and 28 of inclining the sides of the grinding wheels to the axis of the spindle 16 at an angle equal substantially to the pressure angle of the side faces of the blades. The longitudinal adjustment of the sub-bases 31 on the frame are for the purpose of bringing the grinding wheels 27 and 28 into operative relation with the cutter head 17. The angular adjustments of the bases 30 upon the sub-bases 31 can be effected accurately through provision of the scales 33 which are read against the index points 34 on the sub-bases. Any suitable means (not shown) may be employed to secure the bases 30 in adjusted position on the sub-bases 31. If desired scales may be provided for setting the sub-bases 31 on the frame. The sub-bases are secured in their adjusted position by the bolts 35 which pass through elongated slots 36 in the sub-bases and thread into the frame.

The grinding wheel 38 for grinding the tip surfaces of the blades is mounted upon the armature shaft of a motor 40. The motor 40 is pivotally adjustable on a base 41 and can be secured in any adjusted position by tightening up on the pivot bolts 42. The base 41 is angularly adjustable on a sub-base 46 which is in turn adjustable longitudinally on the frame 10. The angular adjustment of the base 41 on the sub-base 46 can be accurately made by the scale 43 which is read against the index pointer 44 and the base may be secured in any position of its angular adjustment by the bolts 45 which pass through circular slots (not shown) formed in the base. The sub-base 46 can be secured in any position of its adjustment on the frame by means of bolts 47 which pass through T-slots 48 in the sub-base.

By reason of their several adjustments, the three grinding wheels 27, 28 and 38 can be accurately adjusted to grind the outside, inside and tip surfaces, respectively, of the cutting blades 18 and 18'. In the grinding operation, the three grinding wheels 27, 28 and 38 are rotated continuously being driven from their respective motors 25, 26 and 40. The cutter head 17 is also rotated continuously on its axis being driven in the direction of rotation of the cutter blades when in use in cutting a gear blank. Simultaneously with the rotation of the grinding wheels and the rotation of the cutter head, there is imparted to the upright 15, which carries the cutter head, a relieving motion which is continuous in one direction during the grinding of all the blades of a group. When the last blade of a group is ground, the direction of movement of the head is reversed and the head is quickly withdrawn to initial position. When the first of the next group of blades has rotated into position for grinding the slow continuous feed movement begins again. The relieving motion does not take place once for each blade, but only once for each group of blades.

The continuous rotation of the cutter head is effected by means of a worm wheel 50 which is keyed to the spindle 16 and which is driven continuously during the operation of the machine by the worm 51. The relieving motion is produced by means of a cam 55. The upright 15 carries a pin or roller 56 which engages in the cam track 57 and in each revolution of the cam 55 there is a slow movement of approach of the upright 15 relative to the grinding wheels and a quick movement of recess, determined by the contour of the cam path 57. In the machine shown, due to the movement of the telescoping shaft 67, a slight correction must be made in the cam path 57 so that the tip of the blades will sweep out a true helix. The cam 55 is keyed to the vertical shaft 58 and is rotated by the worm wheel 59 which is also keyed to this shaft and which is driven by the worm 60.

The shafts 61 and 62 on which the worms 51 and 60, respectively, are mounted are rotated in timed relation to the time of the rotation of the cutter head and the rotation of the cam 55 together so that a proper relieving movement will be produced. This timed rotation of the two shafts 61 and 62 is effected by means of the spur gears 63 and 64, the bevel gear 65, the bevel pinion 66 which meshes therewith, the telescoping shaft 67, and the miter gears 68 and 69. The spur gears 63 and 64 constitute a set of change gears and a suitable ratio will be employed determined by the number of groups of blades on the cutter head 17.

It will be clear that, as the cutter head rotates in the same direction in which the blades are to rotate when cutting a gear blank, the cutting edges of the blades are first engaged by the grinding wheels with the result that as the cutter head rotates and simultaneously feeds toward the grinding wheels, the side and tip surfaces of the blades will be relieved back of the cutting edges. The helices on which the blades are arranged are of such lead that the feeding movement can be continuous for any group of blades and that as one blade passes clear of the grinding wheels, the next succeeding blade of the group will have been brought into position, due to the continuous rotation of the cutter head 17 and the feed movement of the upright 15, so that this blade will be properly engaged and properly ground back. The quick reverse movement takes place after the last blade of a group has been relieved and withdraws the cutter head to a position where in the continued rotation of the cutter head, the first blade of the next group is properly engaged and then in the ensuing rotation of the cutter head and feed movement of the column 15 all the blades of that group are properly relieved. In each revolution of the cutter head, the cam 55 will make one revolution during the time it takes a group of blades to move past the grinding wheel and the change gears 63 and 64 are chosen to secure this result.

The three grinding wheels 27, 28 and 38 may be used simultaneously or if desired they may be used one at a time, to finish the side and tips of the blades one at a time. The principle of operation of the machine remains the same whether all the wheels be used simultaneously or one at a time.

The wheels may be dressed in any usual or suitable manner and it is to be understood that, if desired, a feed motion may be incorporated in the machine to take up for wear or remove additional stock.

The operation will be clear from the preceding description but may be briefly summed up here. The blades to be relieved are secured to the cutter head 17 in groups arranged helically on the head, as shown, and the grinding wheels, 27, 28 and 38 adjusted into the correct operative position. The wheels 27 and 28 are adjusted by swinging the bases 30 on the sub-bases 31 and by adjusting the sub-bases 31 on the frame 10. The wheel 38 is adjusted by swinging the base 41 on the sub-base 46 and the sub-base 46 on the frame and by adjusting the motor 40 about the axis of the pivot-bolts 42. The machine can, then, be started up. The three grinding wheels are driven by their respective motors 25, 26 and 40. The cutter head is rotated from a suitable source of power, such as a motor mounted in the frame of the machine, through the gearing 65, 66, the shaft 67, the gearing 68, 69, the worm 51 and the worm wheel 50. As the cutter head rotates, a slow feed movement is imparted to the upright 15 to carry the blades toward the grinding wheel. This movement is continuous in one direction as the blades of the same helical group pass the wheel and causes the grinding wheel to produce the required relief on the sides and tips of the blades. There is a quick reversal when the last blade of a group has been relieved and the upright 15 is thereby returned to initial position ready to commence the feed anew as the first blade of the next group rotates into position. The movement of the upright 15 is controlled and produced by the cam 55 which is driven from the shaft 62 through the worm 60 and the worm wheel 59. Change gearing 63, 64 is employed to properly time the rotation of the cutter head with the feed of the upright so that the blades will be correctly relieved and these change gears are removable so that proper gears can be employed for any particular set of blades to be relieved. In the arrangement illustrated in the drawings, the cam 55 makes two revolutions for each revolution of the cutter head so that there are two feed movements of the upright 15 during each revolution of the cutter head. The two groups of blades are secured in helical arrangement on the cutter head.

While the invention has been disclosed in connection with a particular embodiment and a particular use for that embodiment, it will be understood that this invention is capable of various further modifications and uses without departing from the intent of the invention and that this application is intended to cover any adaptations, variations, or embodiments of my invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a grinding machine, a rotatable head adapted to have a plurality of cutter blades secured thereto in a plurality of groups or series, in such manner that each group or series extends part way only around the periphery of the head and the blades of each group are helically arranged about the axis of the head, a grinding wheel, means for rotating the grinding wheel, means for rotating the head, and means for producing a relative relieving movement between the head and wheel so timed to the rotation of the head that in a revolution of the head the number of relieving movements produced is equal to the number of the helical series of blades on the head.

2. In a grinding machine, a rotatable head adapted to have a plurality of cutter blades secured thereto in a plurality of groups or series, in such manner that each group or series extends part way around the periphery of the head only and the blades of each group are helically arranged about the axis of the head, a grinding wheel, means for rotating the grinding wheel, means for rotating the head, and means for producing a relative relieving movement between the head and wheel in the direction of the axis of the head so timed to the rotation of the head that in a revolution of the head, the number of relieving movements produced is equal to the number of the helical series of blades on the head.

3. In a grinding machine, a rotatable head adapted to have a plurality of cutter blades secured thereto in a plurality of groups or series in such manner that each group or series extends part way only around the periphery of the head and the blades of each group are helically arranged about the axis of the head, a support, a plurality of grinding wheels rotatably mounted on the support and arranged thereon to engage the outside and inside faces and tip surfaces of the blades, means for rotating the grinding wheels, means for rotating the head, and means for producing a relative relieving movement between the head and support so timed to the rotation of the head that in a revolution of the head the number of relieving movements produced is equal to the number of the helical series of blades on the head.

4. In a grinding machine, a rotatable head adapted to have a plurality of cutter blades secured thereto in a plurality of groups or series in such manner that each group or series extends part way around the periphery of the head only and the blades of each group are helically arranged about the axis of the head, a support, a plurality of grinding wheels rotatably mounted on the support and arranged to engage the outside and inside faces and the tip surfaces of the blades, means for rotating the grinding wheels, means for rotating the head, and means for producing a relative relieving movement between the head and support in the direction of the axis of the head so timed to the rotation of the head that in a revolution of the head, the number of relieving movements produced is equal to the number of helical series of blades on the head.

5. The method of relieving cutter blades which consists in arranging a series of blades along a helix with the blades extending in a direction generally parallel to the axis of the helix, rotating the blades about the axis of the helix and simultaneously producing a relative feed movement between the relieving tool and the blades continuously in one direction as the series of blades rotate past the tool.

6. The method of relieving cutter blades which consists in arranging a plurality of cutter blades in a helix with the blades extending generally parallel to the axis of the helix, rotating the blades about the axis of the helix and simultaneously producing a relative feed movement between the blade and a relieving tool which is continuous as the series of blades rotate past the blades and in a direction parallel to the axis of the helix.

7. The method of relieving cutter blades which consists in arranging about a common axis a plurality of blades in a plurality of groups or series each consisting of equal numbers of blades with the blades of each series forming a partial helical convolution about said axis and with corresponding blades of each series occupying corresponding axial positions along said axis, rotating the blades about said axis and simultaneously producing a relative reciprocatory movement between a relieving tool and the blades so timed to the rotation of the blades on their axis that during rotation of all blades of a group past the tool, the tool moves continuously in one direction and is then returned to initial position in readiness to begin grinding of the first blade of the next group as the same rotates into position.

8. The method of relieving cutter blades which consists in arranging a plurality of blades in a helix with the blades extending generally parallel to the axis of the helix, engaging a grinding wheel with the blades with the operative surface of the wheel inclined to the axis of the helix, and, while rotating the wheel on its axis and the blades about the axis of the helix, producing a relative movement between the wheel and blades in the direction of the axis of the helix which is continuous in one direction during the passage of all of the blades of the same helical group past the wheel.

9. In a machine for relieving cutter blades, a rotatable head constructed so that a plurality of blades may be mounted thereon in one or more helical series with the blades extending in a direction generally parallel to the axis of the head, a relieving tool, means for rotating the head on its axis, and means for producing a relative feed movement between the tool and the head which is continuous in one direction during the rotation of all blades which are arranged on the some helix past the tool.

10. In a machine for relieving cutter blades, a rotatable head constructed so that a plurality of blades may be arranged thereon in one or more helical series with the blades extending in a direction generally parallel to the axis of the head, a relieving tool, means for rotating the head on its axis, and means for producing a relative movement between the tool and the head in the direction of the axis of the head which is continuous in one direction during rotation past the tool of all blades which are arranged in the same helix.

11. In a machine for relief-grinding cutter blades, a rotatable head constructed so that a plurality of blades may be mounted thereon in one or more helical series with the blades extending in a direction generally parallel to the axis of the head, a tool support, a grinding wheel rotatably mounted on the tool support, means for rotating the grinding wheel on its axis, means for rotating the head on its axis and means for simultaneously producing a relative reciprocatory movement between the grinding wheel and the head in the direction of the head axis, said movement being so timed to the head rotation that the wheel is moved continuously in one direction relative to the head during rotation past the wheel of all the blades arranged in the same helix and that then the motion is reversed to position the wheel in readiness to begin grinding on the first blade of the next group.

12. In a machine for relief-grinding cutter blades, a rotatable head constructed so that a plurality of blades may be mounted thereon in one or more helical series with the blades extending in a direction generally parallel to the axis of the head, a tool support, a plurality of grinding wheels rotatably mounted on the tool support and arranged thereon to engage the inside and outside faces and the tip surfaces of the blades, means for rotating the grinding wheels on their axes, means for rotating the head on its axis, and means for producing alternately slow advance and quick return movements between the wheels and the head in the direction of the head axis, said means being operable to advance the wheels relative to the head in one direction during rotation of a group of blades past the wheels and to then quickly separate the head and wheels to position the wheels in readiness to begin the advance movement anew as the first of the new group of blades rotates into position.

13. In a machine for relief-grinding cutter blades, a rotatable head constructed so that a plurality of blades may be secured thereon in a plurality of groups or series in such manner that each group or series extends part-way only around the periphery of the head and the blades of each group are helically arranged about the axis of the head, a grinding wheel, means for rotating the grinding wheel, means for rotating the head, and means for producing relative reciprocatory movements between the wheel and head so timed to the rotation of the head that the relative movement is continuous in one direction during rotation of a group of blades past the head and is then reversed to position the wheel in readiness to begin another forward movement as the first blade of the next group rotates into position.

14. In a machine for relief-grinding cutter blades, a rotatable head constructed so that a plurality of blades may be secured thereon in a plurality of groups or series in such manner that each group or series extends part-way only around the periphery of the head and the blades of each group helically arranged about the axis of the head, a grinding wheel, means for rotating the grinding wheel, means for rotating the head, and means for producing alternate advance and return movements between the wheel and the head, said movements being so timed to the rotation of the head that the advance is continuous in one direction during the rotation of a group of blades past the wheel and the movement is then reversed to position the wheel in readiness to begin anew the advance movement as the first blade of the next group rotates into position.

T. M. DURKAN.